(12) United States Patent
Xu et al.

(10) Patent No.: US 11,094,112 B2
(45) Date of Patent: Aug. 17, 2021

(54) INTELLIGENT CAPTURING OF A DYNAMIC PHYSICAL ENVIRONMENT

(71) Applicant: Foresight AI Inc., Los Gatos, CA (US)

(72) Inventors: Shili Xu, Santa Clara, CA (US); Matheen Siddiqui, Long Beach, CA (US); Chang Yuan, Los Gatos, CA (US)

(73) Assignee: Foresight AI Inc., Los Gatos, CA (US)

( * ) Notice: Subject to any disclaimer, the term of this patent is extended or adjusted under 35 U.S.C. 154(b) by 0 days.

(21) Appl. No.: 16/541,927

(22) Filed: Aug. 15, 2019

(65) Prior Publication Data

US 2020/0082614 A1 Mar. 12, 2020

Related U.S. Application Data

(60) Provisional application No. 62/727,986, filed on Sep. 6, 2018.

(51) Int. Cl.
*G06T 15/00* (2011.01)
*G06T 17/05* (2011.01)
(Continued)

(52) U.S. Cl.
CPC ............ *G06T 17/05* (2013.01); *B64C 39/024* (2013.01); *G06T 7/73* (2017.01);
(Continued)

(58) Field of Classification Search
CPC .................. G06T 17/00; G06T 7/735; G06T 2207/30241; G06T 2210/56; B64C 39/024; B64C 2201/127; B64C 2201/123
(Continued)

(56) References Cited

U.S. PATENT DOCUMENTS 8,290,305 B2 * 10/2012 Minear ................. G06T 7/32
382/294
9,464,894 B2 * 10/2016 Napier .................. G06T 7/248
(Continued)

OTHER PUBLICATIONS

Pierre Biasutti. 2D Image Processing Applied to 3D LiDAR Point Clouds. Image Processing [eess.IV], Université de Bordeaux, 2019. English.*
(Continued)

*Primary Examiner* — Phu K Nguyen
(74) *Attorney, Agent, or Firm* — Morrison & Foerster LLP

(57) ABSTRACT

The present invention generally relates to generating a three-dimensional representation of a physical environment, which includes dynamic scenarios. An exemplary device comprises one or more processors; a memory; and one or more programs that includes instructions for: obtaining a set of three-dimensional data of the physical environment, wherein the three-dimensional data is associated with a first sensing device; based on the set of three-dimensional data, generating a three-dimensional representation of the physical environment; obtaining a set of two-dimensional data of the physical environment, wherein the set of two-dimensional data is associated with a second sensing device and wherein the set of two-dimensional data comprises information of a dynamic object in the physical environment; generating an alignment between the three-dimensional representation of the physical environment and the set of two-dimensional data; and based on the alignment, obtaining a set of three-dimensional information associated with the dynamic object.

17 Claims, 14 Drawing Sheets
(8 of 14 Drawing Sheet(s) Filed in Color)

(51) Int. Cl.
*G06T 7/73* (2017.01)
*B64C 39/02* (2006.01)

(52) U.S. Cl.
CPC .. *B64C 2201/123* (2013.01); *B64C 2201/127* (2013.01); *G06T 2207/30241* (2013.01)

(58) Field of Classification Search
USPC ........................................................ 345/418
See application file for complete search history.

(56) References Cited

U.S. PATENT DOCUMENTS

| | | | | |
|---|---|---|---|---|
| 10,070,101 | B2* | 9/2018 | Newman | G06T 7/74 |
| 10,318,844 | B2* | 6/2019 | Trouve | G06K 9/627 |
| 10,452,949 | B2* | 10/2019 | Jia | H04N 13/204 |
| 10,527,711 | B2* | 1/2020 | Choi | B64D 47/08 |

OTHER PUBLICATIONS

Sualeh M, Kim GW. Dynamic multi-lidar based multiple object detection and tracking. Sensors. Jan. 2019; 19(6):1474.*

De Silva, V., Roche, J. and Kondoz, A., 2017. Fusion of LiDAR and camera sensor data for environment sensing in driverless vehicles.*
Wang R. 3D building modeling using images and LiDAR: A review. International Journal of Image and Data Fusion. Dec. 1, 2013;4(4):273-92.*
Asvadi A, Girão P, Peixoto P, Nunes U. 3D object tracking using RGB and LIDAR data. In2016 IEEE 19th International Conference on Intelligent Transportation Systems (ITSC) Nov. 1, 2016 (pp. 1255-1260). IEEE.*
Zhao X, Sun P, Xu Z, Min H, Yu H. Fusion of 3D LIDAR and camera data for object detection in autonomous vehicle applications. IEEE Sensors Journal. Jan. 13, 2020;20(9):4901-13.*
Garcia F, Martin D, De La Escalera A, Armingol JM. Sensor fusion methodology for vehicle detection. IEEE Intelligent Transportation Systems Magazine. Jan. 18, 2017;9(1):123-33.*
Schlosser J, Chow CK, Kira Z. Fusing lidar and images for pedestrian detection using convolutional neural networks. In2016 IEEE International Conference on Robotics and Automation (ICRA) May 16, 2016 (pp. 2198-2205). IEEE.*
Wang Y, Ewert D, Schilberg D, Jeschke S. Edge extraction by merging 3D point cloud and 2D image data. In2013 10th International Conference and Expo on Emerging Technologies fora Smarter World (CEWIT) Oct. 21, 2013 (pp. 1-6). IEEE.*

* cited by examiner

900

Obtaining a set of three-dimensional data of the physical environment, wherein the three-dimensional data is associated with a first sensing device
902

Based on the set of three-dimensional data, generating a three-dimensional representation of the physical environment
904

Obtaining a set of two-dimensional data of the physical environment, wherein the set of two-dimensional data is associated with a second sensing device and wherein the set of two-dimensional data comprises information of a dynamic object in the physical environment
906

Generating an alignment between the three-dimensional representation of the physical environment and the set of two-dimensional data
908

Based on the alignment, obtaining a set of three-dimensional information associated with the dynamic object
910

Providing an output based on the set of three-dimensional information associated with the dynamic object
912

FIG. 9

INTELLIGENT CAPTURING OF A DYNAMIC PHYSICAL ENVIRONMENT

CROSS-REFERENCE TO RELATED APPLICATION

This application claims the benefit of U.S. Provisional Application 62/727,986, filed on Sep. 6, 2018, the entire content of which is incorporated herein by reference for all purposes.

FIELD OF THE INVENTION

The present disclosure relates generally to image analysis, and more specifically to systems and methods for efficiently and accurately generating a high-fidelity three-dimensional representation of a physical environment that can include dynamic objects and scenarios.

BACKGROUND

Two-dimensional ("2D") sensors are commonly used to capture information about a physical environment. For example, a consumer-grade drone equipped with a video camera can be dispatched to capture 2D videos of the physical environment. However, 2D sensors fail to capture important information about the physical environment, such as depth data. Further, consumer-grade drones, while relatively cheap and easy to maintain, are equipped with relatively low-fidelity sensors. Thus, it is difficult to use such devices to obtain a high-fidelity and rich understanding of the physical environment, which may include dynamic objects (e.g., moving cars and pedestrians) and dynamic scenarios (e.g., traffic collisions and traffic patterns).

In comparison, professional-grade drones are often equipped with high-fidelity 3D sensors such as LiDAR sensors or radar sensors, as well as high-fidelity navigation sensors. However, these professional-grade drones are relatively expensive and difficult to maintain. Thus, it is often impracticable to regularly dispatch a large number of professional-grade drones to the field to gather dynamic information about the physical environment. Further, processing a large volume of three-dimensional data regularly captured by these devices can be inefficient and resource-consuming.

Thus, there is a need for techniques for generating a high-fidelity representation of the physical environment, which can include dynamic objects and dynamic traffic, while minimizing operational cost.

BRIEF SUMMARY

In some embodiments, a computer-enabled method for generating a three-dimensional representation of a physical environment comprises: obtaining a set of three-dimensional data of the physical environment, wherein the three-dimensional data is associated with a first sensing device; based on the set of three-dimensional data, generating a three-dimensional representation of the physical environment; obtaining a set of two-dimensional data of the physical environment, wherein the set of two-dimensional data is associated with a second sensing device and wherein the set of two-dimensional data comprises information of a dynamic object in the physical environment; generating an alignment between the three-dimensional representation of the physical environment and the set of two-dimensional data; based on the alignment, obtaining a set of three-dimensional information associated with the dynamic object; and providing an output based on the set of three-dimensional information associated with the dynamic object.

In some embodiments, the set of three-dimensional data of the physical environment comprises one or more scanned points by a LiDAR sensor of the first sensing device.

In some embodiments, the three-dimensional representation of the physical environment comprises a three-dimensional point cloud, a three-dimensional surface model, a two-dimensional projection image, a three-dimensional vector based road map, or a combination thereof.

In some embodiments, generating the three-dimensional representation of the physical environment comprises: identifying one or more predefined semantic types.

In some embodiments, generating the three-dimensional representation of the physical environment comprises: identifying one or more predefined features.

In some embodiments, generating an alignment between the three-dimensional representation of the physical environment and the set of two-dimensional data comprises: identifying pose information of a sensor of the second sensing device.

In some embodiments, the sensor is a camera.

In some embodiments, generating an alignment between the three-dimensional representation of the physical environment and the set of two-dimensional data comprises: identifying one or more predefined semantic types based on the set of two-dimensional data.

In some embodiments, generating an alignment between the three-dimensional representation of the physical environment and the set of two-dimensional data comprises: identifying one or more predefined features based on the set of two-dimensional data.

In some embodiments, obtaining a set of three-dimensional information associated with the dynamic object comprises: detecting the dynamic object from the set of two-dimensional data; and projecting the detected dynamic object to the three-dimensional representation of the physical environment.

In some embodiments, the method further comprises obtaining a trajectory of the dynamic object.

In some embodiments, the method further comprises refining the trajectory based on one or more dynamic models associated with the dynamic object.

In some embodiments, the method further comprises obtaining one or more geo-referenced dynamic traffic scenarios.

In some embodiments, the first sensing device is an unmanned aerial system.

In some embodiments, the second sensing device is an unmanned aerial system.

In some embodiments, an exemplary electronic device comprises one or more processors; a memory; and one or more programs, wherein the one or more programs are stored in the memory and configured to be executed by the one or more processors, the one or more programs including instructions for: obtaining a set of three-dimensional data of the physical environment, wherein the three-dimensional data is associated with a first sensing device; based on the set of three-dimensional data, generating a three-dimensional representation of the physical environment; obtaining a set of two-dimensional data of the physical environment, wherein the set of two-dimensional data is associated with a second sensing device and wherein the set of two-dimensional data comprises information of a dynamic object in the physical environment; generating an alignment between the three-dimensional representation of the physical environment and the set of two-dimensional data; based on the alignment, obtaining a set of three-dimensional information associated with the dynamic object; and providing an output based on the set of three-dimensional information associated with the dynamic object.

In some embodiments, a non-transitory computer-readable storage medium stores one or more programs, the one or more programs comprising instructions, which when executed by one or more processors of an electronic device having a display, cause the electronic device to: obtain a set of three-dimensional data of the physical environment, wherein the three-dimensional data is associated with a first sensing device; based on the set of three-dimensional data, generate a three-dimensional representation of the physical environment; obtain a set of two-dimensional data of the physical environment, wherein the set of two-dimensional data is associated with a second sensing device and wherein the set of two-dimensional data comprises information of a dynamic object in the physical environment; generate an alignment between the three-dimensional representation of the physical environment and the set of two-dimensional data; based on the alignment, obtain a set of three-dimensional information associated with the dynamic object; and provide an output based on the set of three-dimensional information associated with the dynamic object.

DESCRIPTION OF THE FIGURES

The patent or application file contains at least one drawing executed in color. Copies of this patent or patent application publication with color drawings will be provided by the Office upon request and payment of the necessary fee.

FIG. 9 depicts a block diagram of an exemplary process for generating a high-fidelity and three-dimensional representational of a physical environment, in accordance with some embodiments.

DETAILED DESCRIPTION

Figure 1:
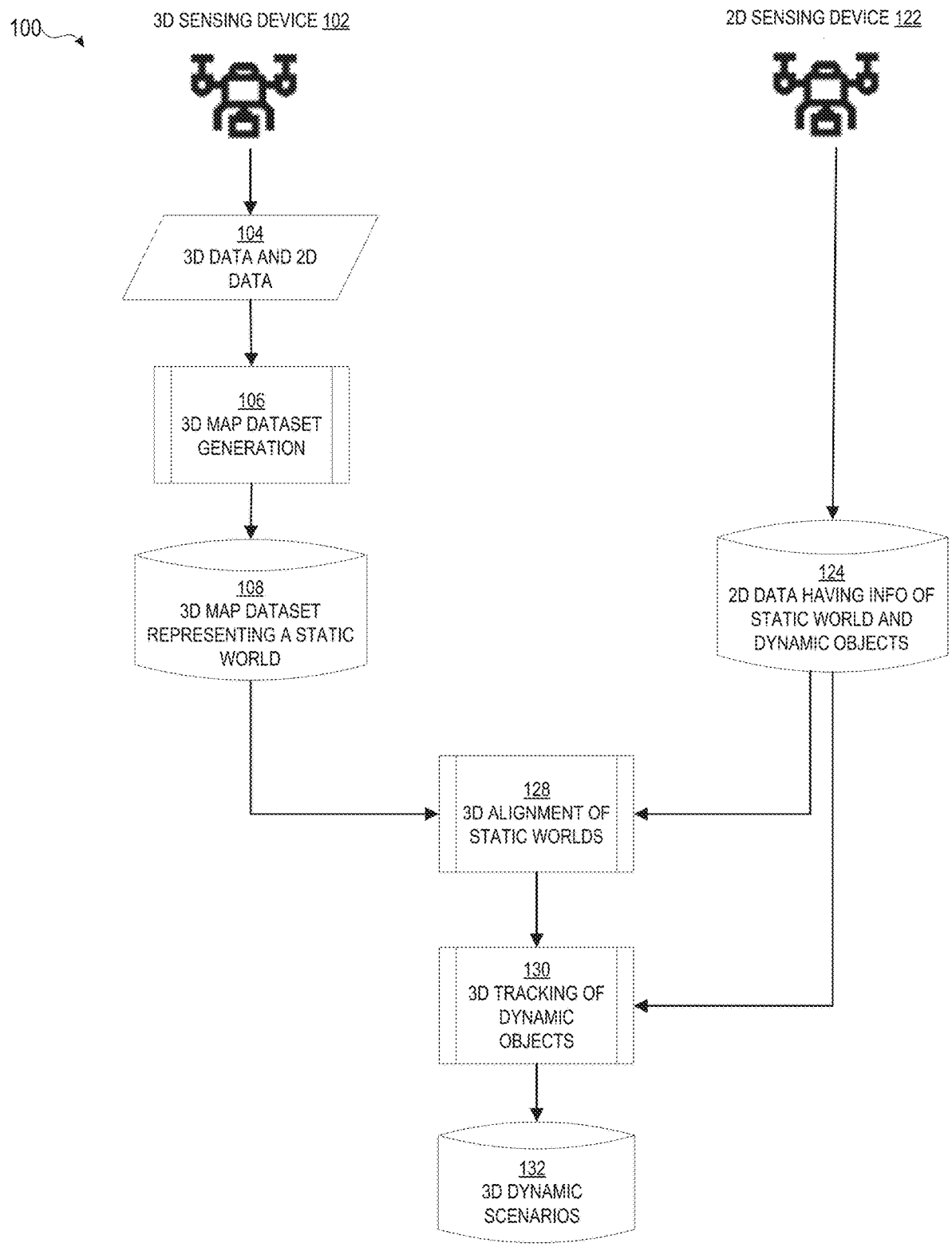
FIG. 1 depicts an exemplary process for efficiently and accurately generating a high-fidelity and three-dimensional representational of a physical environment, in accordance with some embodiments

The present invention provides techniques for generating a high-fidelity representation of the physical environment using a combination of 3D sensing devices professional-grade drones) and 2D sensing devices (e.g., consumer-grade drones). In some embodiments, one or more 3D sensing devices are deployed to capture high-fidelity 3D data and 2D data of a physical environment. The high-fidelity data is processed to construct a high-fidelity 3D map dataset. The 3D map dataset includes rich information of the static world, such as 3D information of roads, parking lots, and traffic signs. In some embodiments, the 3D map dataset includes information particularly identified to facilitate alignment between the 3D map dataset and low-fidelity 2D data, such as unique visual characteristics of stationary objects (e.g., color patch on a building facet).

One or more 2D sensing devices (e.g., consumer-grade drones) are deployed to capture dynamic objects and dynamic scenarios in the physical environment. The 2D data, such as videos and low-fidelity GPS data, can be aligned with the 3D map dataset. Based on the alignment, the dynamic objects and dynamic scenarios can be correlated (e.g., geo-referenced) to a high-fidelity representation of the physical environment. In other words, the present invention allows 2D sensing devices to collect relatively low-fidelity 2D data (e.g., 2D videos) of a physical environment, which requires low operational cost, and derives a comprehensive and high-fidelity 3D representation of the physical environment having dynamic objects and dynamic scenarios. Such high-fidelity 3D dynamic scenarios have a wide variety of applications. For example, the dynamic scenarios can be used as training data to obtain highly precise autonomous driving algorithms. As another example, the dynamic scenarios by can queried (e.g., by a human operator or a device) to obtain a rich understanding of events (e.g., how cars and pedestrians behave at a particular intersection). The rich understanding can inform and guide decision-making by humans and machines. For example, a drone can use traffic patterns to avoid obstacles and perform a precise landing. Generally, the present invention can be used to enhance any use cases of 2D sensors, including inspection and surveillance of physical environments. In some embodiments, the dynamic scenarios can be combined with context data to identify events of interest (e.g., jaywalking, theft).

The following description sets forth exemplary methods, parameters, and the like. It should be recognized, however, that such description is not intended as a limitation on the scope of the present disclosure but is instead provided as a description of exemplary embodiments.

Although the following description uses terms "first," "second," etc. to describe various elements, these elements should not be limited by the terms. These terms are only used to distinguish one element from another. For example, a first sensing device could be termed a second sensing device, and, similarly, a second sensing device could be termed a first sensing device, without departing from the scope of the various described embodiments. The first sensing device and the second sensing device are both sensing devices, but they are not the same sensing device.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1 depicts an exemplary process 100 for efficiently and accurately generating a high-fidelity and three-dimensional representational of a physical environment having dynamic objects and/or dynamic scenarios, in accordance with some embodiments. The representation of the physical environment can include one or more representations of a static world having stationary elements (e.g., roads, buildings, traffic signs), one or more geo-referenced representations of dynamic elements (e.g., vehicles, pedestrians, riders), and one or more geo-referenced representations of dynamic scenarios/events (e.g., motions of all dynamic elements, traffic patterns, collisions).

The representation of the physical environment includes data (e.g., location, dimension, speed) having a high level of fidelity. In some embodiments, the position information can be accurate to within a margin of 5-10 cm or less. In some embodiments, the orientation information can be accurate to within a margin of 1 degree or less. In some embodiments, the speed information can be accurate to within a margin of 1 cm/s or less. In some embodiments, the timing information can be accurate to within 1 ms (i.e., events happen with 1 ms of when the system considers they happen). In some embodiments, the physical dimensions can be accurate to within a margin of 5 cm or less. In some embodiments, the distance information can be accurate to within a margin of 5 cm or less.

Process 100 is performed, for example, using one or more electronic devices. In some examples, the blocks of process 100 are divided up in any manner among the one or more electronic devices performing process 100. In some examples, the one or more electronic devices include the 3D sensing device 102, the 2D sensing device 122, and additional electronic devices that are communicatively coupled with each other. Thus, while portions of process 100 are described herein as being performed by particular devices, it will be appreciated that process 100 is not so limited. In process 100, some blocks are, optionally, combined, the order of some blocks is, optionally, changed, and some blocks are, optionally, omitted. In some examples, additional steps may be performed in combination with the process 100. Accordingly, the operations as illustrated (and described in greater detail below) are exemplary by nature and, as such, should not be viewed as limiting.

With reference to FIG. 1, one or more 3D sensing devices 102 are used to capture information of a physical environment (e.g., a parking lot, a road segment) to obtain 3D data and 2D data 104. The device 102 can include any physical vehicle that is mobile (e.g., in the air, on the ground, on the water, and/or underground). In some embodiments, the one or more 3D sensing devices 102 comprise one or more professional-grade unmanned aerial systems (UAS) or drones, one or more manned aircrafts, one or more on-ground vehicles, one or more bicycles or motorcycles, one or more underground machineries, or any combination thereof. In some embodiments, the one or more 3D sensing devices 102 can be deployed to survey the physical environment at different times.

The device 102 has three-dimensional sensing capabilities and optionally two-dimensional sensing capabilities and navigational sensing capabilities. In some embodiments, the device 102 is equipped with one or more high-fidelity sensors capable of capturing three-dimensional data ("3D sensors"). A 3D sensor can sense a 3D position and/or velocity of a physical point, such as a LiDAR sensor module or a radar sensor module. In some embodiments, the device 102 is additionally equipped with one or more sensors capable of capturing two-dimensional data ("2D sensors"). A 2D sensor can sense capture 2D pixel array of the imagery around the sensor, such as a visible light camera, an IR camera, or a multi-spectrum camera. In some embodiments, the device 102 is additionally equipped with one or more navigation sensors. The navigation sensor can include a combination of positioning sensor(s), such as a global positioning system ("GPS"), a Global Navigation Satellite System ("GLONASS"), a BeiDou Navigation Satellite System ("BDS"), and a barometer, as well as pose measurement system(s), such as an inertial measurement unit ("MU"). In some embodiments, localization accuracy for sensors of the 3D sensing device can be <10 cm in position, and <1 Degree in orientation.

At step 106, 3D map dataset generation is performed. Specifically, the 3D data and 2D data 104 are analyzed to obtain a high-fidelity 3D map dataset 108 representing the static aspects of the physical environment. The 3D map dataset includes information of the stationary physical environment (e.g., road, parking lot) and stationary physical objects in the environment (e.g., traffic signs, lane markings, trees). In some embodiments, the 3D map dataset includes semantic types (e.g., lane markings, road boundaries, traffic signs, regions of interest) and/or features (e.g., unique building facets, road curvatures, reflectivity of various surfaces, unique patches, unique geometric characteristics) identified in the physical environment in order to facilitate the alignment of the 3D map dataset with 2D data (e.g., videos) of the physical environment at a later stage. As discussed below, the semantic types or the features (e.g., unique patches) can be generated based on color information, LiDAR intensity information (Infrared), or a combination thereof. In some embodiments, the 3D map dataset includes a dataset that includes multiple layers of data representing the static world, such as 3D point cloud, 3D surface model (e.g., as derived from the 3D point cloud), 2D projection image (i.e., ortho-image), and 3D vector based road map (e.g., including identified geo-referenced semantic types). Step 106 is further described in detail with reference to FIG. 2 below.

With reference to FIG. 1, one or more 2D sensing devices 122 are used to capture information of the same physical environment surveyed by the one or more 3D sensing devices 102. The device 122 can include any physical vehicle that is mobile (e.g., in the air, on the ground, on the water, and/or underground). In some embodiments, the one or more 2D sensing devices 122 comprise one or more consumer-grade unmanned aerial systems (UAS) or drones, one or more manned aircrafts, one or more on-ground vehicles, one or more bicycles or motorcycles, one or more underground machineries, or any combination thereof.

The device 122 has two-dimensional sensing capabilities and navigational sensing capabilities. In some embodiments, the device 122 is equipped with one or more sensors capable of capturing two-dimensional data ("2D sensors"). A 2D sensor can sense capture 2D pixel array of the imagery around the sensor, such as a visible light camera, an IR camera, or a multi-spectrum camera. In some embodiments, the device 122 is additionally equipped with one or more navigation sensors. The navigation sensor can include a combination of positioning sensor(s), such as a GPS, a GLONASS, a BDS, and a barometer, as well as pose measurement system(s), such as an IMU. In some embodiments, the 2D sensing device 122 is equipped with sensors of lower fidelity than the 3D sensing device 102. In some embodiments, localization accuracy for sensors of the 2D sensing device can be 30 cm to 1 meter (or worse) in position and <5-10 Degrees in orientation. Accordingly, the 2D sensing device 122 may be cheaper and easier to maintain, and it may be more feasible to deploy a large number of 2D sensing devices to frequently survey the physical environment to obtain dynamic information.

The one or more 2D sensing devices are deployed to survey the same physical environment to obtain 2D data 124. The 2D data 124 includes information of the static world, such as the stationary environment (e.g., road, parking lot) and the stationary objects in the environment (e.g., trees, traffic signs). Additionally, the 2D data 124 includes information of dynamic objects (e.g., pedestrian, riders, and vehicles). In some embodiments, the capturing of the 2D data is performed after the capturing of the 3D data. In some embodiments, the one or more 2D sensing devices have access to the 3D map dataset 108 via its local memory or via the cloud.

At step 128, the 3D map dataset 108 is aligned with 2D data 124. Specifically, the 2D data 124 captured by the 2D sensing device 122 is aligned with the high-fidelity 3D map dataset to allow for a richer understanding of the 2D data, which can include dynamic objects (e.g., moving vehicles) and dynamic traffic scenarios (e.g., collisions). In some embodiments, the alignment process includes identification of poses of the 2D sensors (e.g., 2D camera) mounted on the 2D sensing device at a given time. The pose of a sensor includes the 3D position and orientation (rotation angles) of the sensor usually in form 6 degrees of freedom (DOF; X, Z; pitch, roll, yaw), relative to a pre-selected world origin. Step 128 is further described in detail with reference to FIG. 3 below.

At step 130, one or more dynamic objects captured by the 2D sensing device are tracked and 3D information of these dynamic objects is obtained. In some embodiments, the geo-referenced and time-referenced motion trajectories of the dynamic objects are identified and refined. The identification and refinement can be based on dynamic models associated with certain object type (e.g., vehicle, human) and/or object shape models (e.g., associated with a make/model of a vehicle). Step 130 is further described in detail with reference to FIG. 4 below.

As depicted in FIG. 1, the process 100 derives a set of 3D dynamic scenarios 132 based on step 130. In some embodiments, the dynamic scenarios include behaviors of dynamic objects (e.g., motion trajectories of vehicles, lane change, turns, actions of pedestrian such as jogging and crawling), interactions between dynamic objects (e.g., collisions), events (e.g., cars driving out of road boundaries), or a combination thereof. All of the dynamic objects and scenarios can be referenced with the rich information included in the 3D map dataset example, each object's location (e.g., altitude, latitude, and elevation), speed, acceleration/deceleration, trajectory, and behavior at a given time can be identified at a high level of fidelity. Further, each dynamic object's relationship with the stationary objects in the physical environment (e.g., lane markings) can be identified with a high level of fidelity.

In other words, the process 100 allows 2D sensing devices to collect relatively low-fidelity 2D data (e.g., 2D videos) of a physical environment (e.g., on a regular basis), which requires low operational cost over time, and derives a comprehensive and high-fidelity 3D representation of the physical environment having dynamic objects and dynamic scenarios. Such high-fidelity 3D dynamic scenarios have a wide variety of applications. For example, the dynamic scenarios can be used as training data to obtain highly precise autonomous driving algorithms. As another example, the dynamic scenarios by can queried (e.g., by a human operator or a device) to obtain a rich understanding of events (e.g., how cars and pedestrians behave at a particular intersection). The rich understanding can inform and guide decision-making by humans and machines. For example, a drone can use traffic patterns to avoid obstacles and perform a precise landing. Generally, the dynamic scenarios can be used to enhance any use cases of 2D sensors, including inspection and surveillance of physical environments. In some embodiments, the dynamic scenarios can be combined with context data to identify events of interest (e.g., jaywalking, theft).

Figure 2:
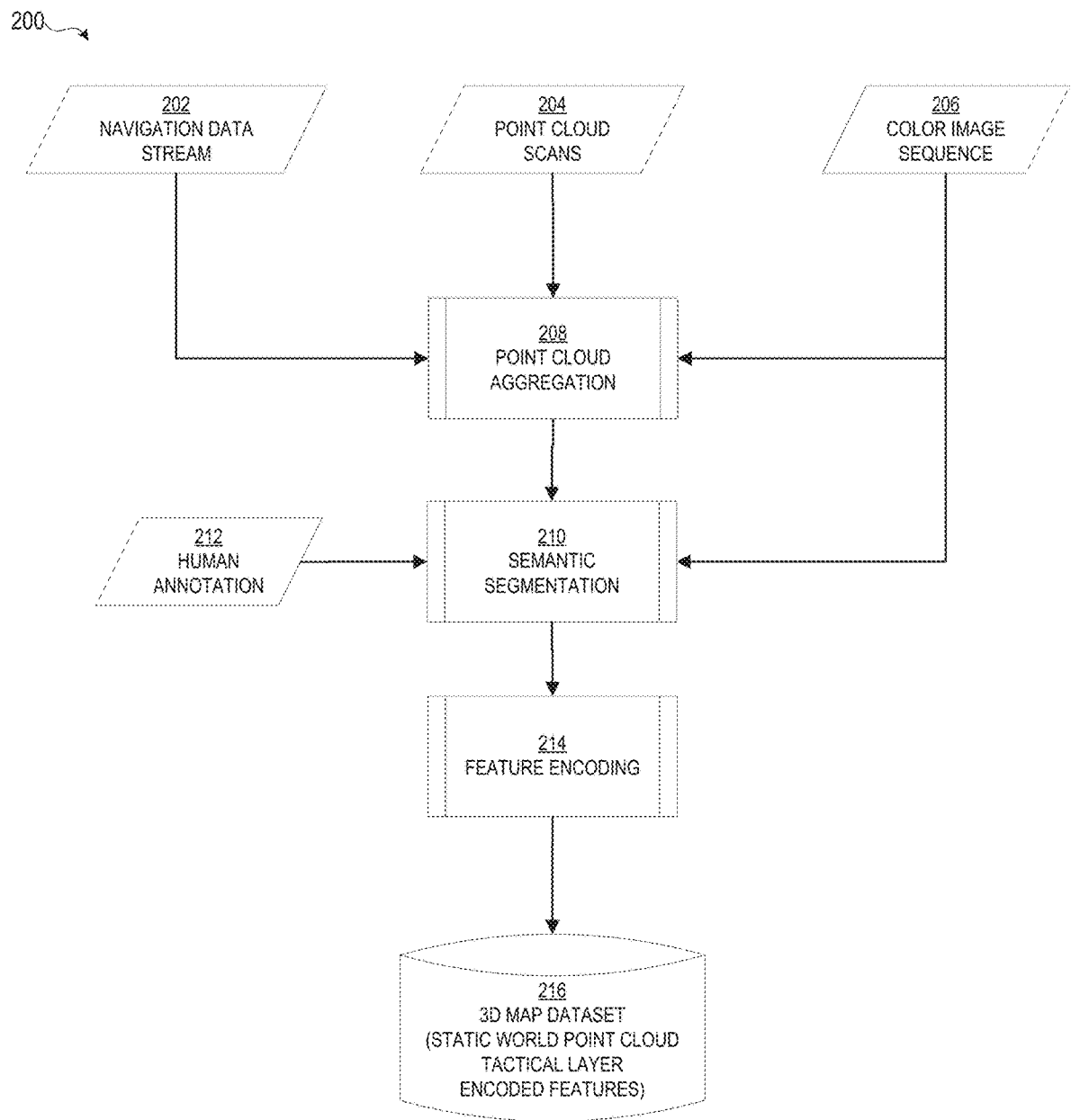
FIG. 2 depicts an exemplary process for generating a high-fidelity 3D map dataset representing a static world, in accordance with some embodiments.

FIG. 2 depicts an exemplary process 200 for generating a high-fidelity 3D map dataset representing a static world. The process 200 can correspond to the step 106 ("3D Map Dataset Generation") of process 100 depicted in FIG. 1. As described above, one or more 3D sensing devices (e.g., device 102 shown in FIG. 1) have captured data of a physical environment (e.g., 3D data and 2D data 104 shown in FIG. 1). During process 200, the data is analyzed to obtain a high-fidelity 3D map dataset 216 representing the static aspects of the physical environment. In some embodiments, the resulting 3D map dataset 216 corresponds to the 3D map dataset 108 ("3D Map Dataset Representing a Static World") of process 100 depicted in FIG. 1.

As described above, the 3D map dataset includes information of the stationary physical environment (e.g., road, parking lot) and stationary physical objects in the environment (e.g., traffic signs, lane markings, trees). In some embodiments, the 3D map dataset includes a dataset that includes multiple layers of data representing the static world, such as 3D point cloud, 3D surface model, 2D projection image (2D color ortho-image), 3D vector based road map, and LiDAR-intensity/infrared data.

Process 200 is performed, for example, using one or more electronic devices. In some examples, the blocks of process 200 are divided up in any manner among the one or more electronic devices performing process 200. In some examples, the one or more electronic devices include the 3D sensing device 102, the 2D sensing device 122, and additional electronic devices that are communicatively coupled with each other. Thus, while portions of process 200 are described herein as being performed by particular devices, it will be appreciated that process 200 is not so limited. In process 200, some blocks are, optionally, combined, the order of some blocks is, optionally, changed, and some blocks are, optionally, omitted. In some examples, additional steps may be performed in combination with the process 200. Accordingly, the operations as illustrated (and described in greater detail below) are exemplary by nature and, as such, should not be viewed as limiting.

With reference to FIG. 2, the generation of 3D map dataset is based on navigation data stream 202, point cloud scans 204, color image sequence 206, or any combination thereof. The data 202, 204, and 206 are captured by one or more 3D sensing devices (e.g., device 102 of FIG. 1). The navigation data stream 202 can include geographical data measured by the navigation sensors (e.g., GPS, IMU) of the 3D sensing devices. The point cloud scans 204 can include results from 3D scans performed by 3D sensors (e.g., LiDAR, radar) of the 3D sensing devices, including LiDAR intensity data. The color image sequence 206 can include 2D data (e.g., 2D pixel array, videos) measured by the 2D sensors (e.g., cameras) of the 3D sensing devices.

At step 208, point cloud aggregation is performed based on the navigation data stream 202, the point cloud scans 204, and the color image sequence 206. For example, the system can aggregate results from different 3D scans (e.g., at different times, by different 3D sensors) to construct a single point cloud. Further, the system can identify correlations between the point cloud scans 204 and the navigation data stream 202 to associate points in the point cloud with geographical information (e.g., longitude, latitude, elevation). Further, the system can identify correlations between the point cloud scans 204 and the color image sequence 206 to associate points in the point cloud with color information. In some embodiments, the correlations can be established based on the time stamps associated with the data and/or the known positioning of the sensors. In some embodiments, the step 208 results in a colorized and geo-referenced 3D point cloud representative of the physical environment surveyed by the 3D sensing devices.

At step 210, semantic segmentation is performed to identify predefined semantic types in the physical environment. The predefined semantic types can include objects of interest and shapes of interest, such as traffic signs, lane markings, and road boundaries. In some embodiments, the system can identify a portion of the point cloud to be associated with a predefined semantic type based on physical characteristics (e.g., color, shape, pattern, dimension, irregularity or uniqueness) of the points. Further, the system can identify a portion of the point cloud to be associated with a predefined semantic type based on metadata (e.g., location) of the points. Further, the system can identify a portion of the point cloud and/or assign a confidence value to the identification by analyzing point clouds measured at different times. In some embodiments, one or more neural network classifiers are used to identify predefined semantic types applicable to points in the point cloud.

In some embodiments, at step 212, human annotation is performed to verify the semantic types identified in step 210. For example, a human operator reviews one or more of the semantic types identified in step 210 (e.g., as marked in the color image sequence) and can confirm, reject, or modify the semantic annotations. In some embodiments, the human operator is presented with only semantic annotations having confidence scores below a predefined threshold.

In some embodiments, the identified semantic types are associated with the corresponding point(s) in the point cloud as labels or annotations. In some embodiments, the identified semantic types form a tactical layer that can be referenced to other data in the 3D map dataset, such as the 3D point cloud.

At step 214, feature encoding is performed. Features include unique characteristics in the physical environment that can facilitate, at a later stage, the alignment of the point cloud with 2D data captured by 2D sensing devices. In some embodiments, the identified features are associated with the corresponding point(s) in the point cloud as labels, tags, or annotations. In some embodiments, the identified features are included as geo-referenced features of a tactical layer, which is a part of the 3D map dataset.

Figure 5A:
FIG. 5A depicts an ortho-image constructed based on an exemplary aggregated and colorized 3D point cloud corresponding to a physical environment, in accordance with some embodiments.
Figure 5B:
FIG. 5B depicts an exemplary visualization of varying levels of LiDAR intensities corresponding to different regions of a physical environment, in accordance with some embodiments.

In some embodiment, the features are derived from LIDAR measurements directly. This includes depth discontinuity and variations and values of LiDAR intensity. For example, the surface of a traffic sign is more reflective than the surface of a pavement. As such, the LiDAR signals reflected by the traffic signal may be more intense (e.g., having higher amplitude) than LiDAR signals reflected by the pavement, even if the pavement and the traffic sign are of equal distance away from the LiDAR sensors on the 3D sensing devices. FIG. 5B depicts an exemplary visualization of varying levels of LiDAR intensities corresponding to different regions of a physical environment, with red coloring indicating higher reflectivity (e.g., stronger returning LiDAR signals). As another example, depth discontinuity, which may signify a vertical surface, may be captured by both the 3D sensing devices and the 2D sensing devices when surveying the physical environment.

In some embodiments, points in the point cloud can be associated with the corresponding identified features (e.g., LiDAR intensity data) in order to facilitate alignment between the 3D point cloud and 2D data. In some embodiments, the identified features are included as geo-referenced features (e.g., patches of high-reflectivity areas, textures, patches of textures, geometries) in a tactical layer, which is a part of the 3D map dataset.

In some embodiments, the features include structures having unique visual characteristics such as special encoded feature topologies (e.g., curve of the road) and planar color patches (e.g., building facets). The features can be identified from 3D data or 2D data collected by the 3D sensing device. In some embodiments, the identified features are included as geo-referenced features of a tactical layer, which is a part of the 3D map dataset.

In some embodiments, the features include regions of interest. Regions of interests are high-confidence static regions that are more reliable references to match and align the 3D map dataset with 2D data. For example, a region of interest can include mostly stationary objects and is less likely to change over time. In contrast, a region corresponding to the center of a highway or a billboard is more likely to contain moving objects and change overtime. Regions of interest can be identified based on semantic types defined in step 210. In some embodiments, points in the point cloud corresponding to regions of interest can be associated with corresponding confidence scores. In some embodiments, the identified regions of interest are included as geo-referenced features of a tactical layer, which is a part of the 3D map dataset.

After feature encoding is complete, the system obtains 3D map dataset 216. The 3D map dataset includes a dataset that includes multiple layers of data representing the static world, such as 3D point cloud, 3D surface model, 2D projection image, and 3D vector based road map. In some embodiments, the 3D map dataset 216 includes one or more static world point cloud, one or more tactical layers, one or more encoded features, or any combination thereof. In some embodiments, moving objects (e.g., cars, pedestrians) are detected and filtered out of the 3D map dataset 216, for example, during step 208. FIG. 5A depicts an Ortho-image constructed based on an exemplary aggregated and colorized 3D point cloud corresponding to a physical environment.

Figure 3:
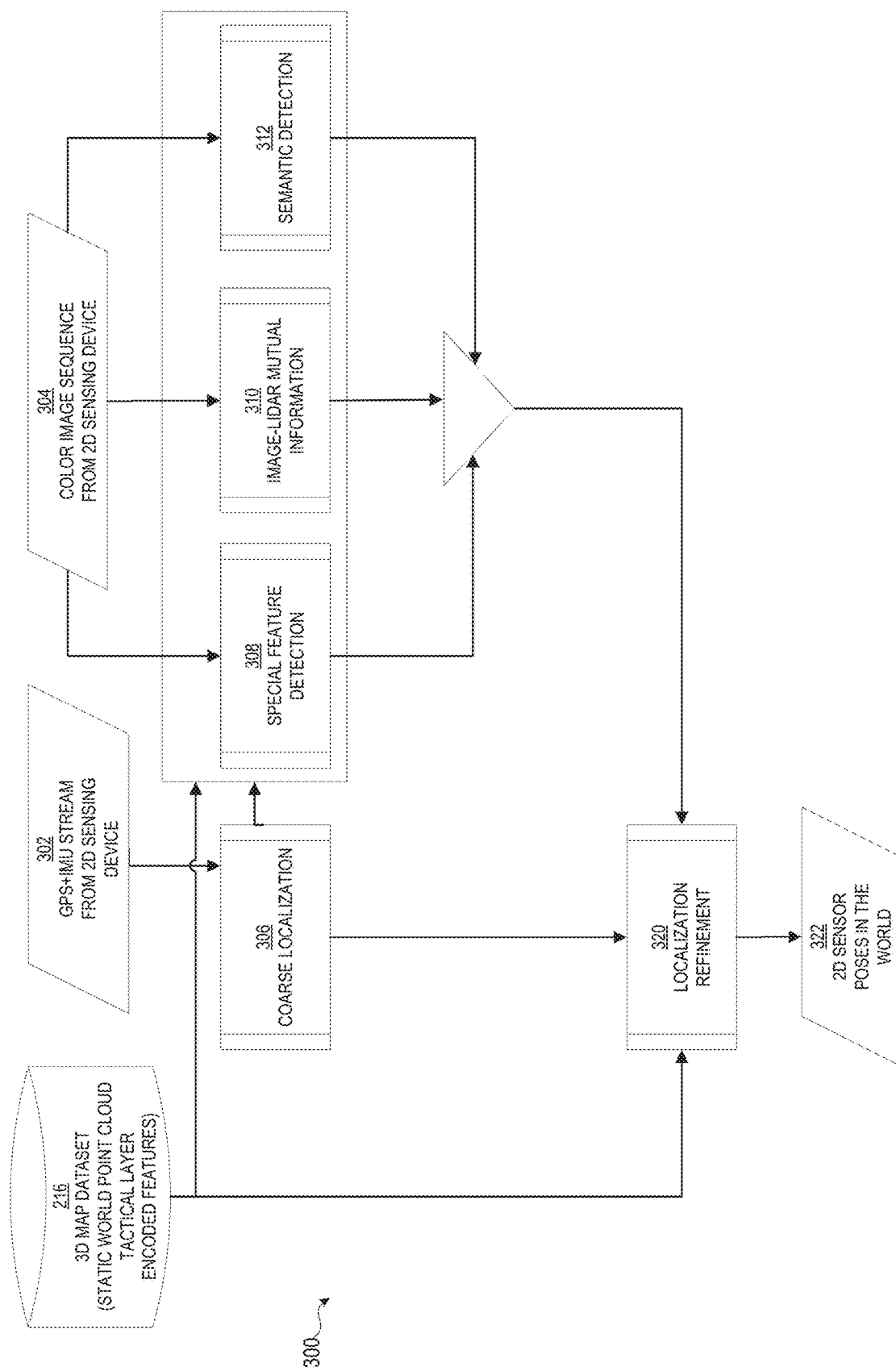
FIG. 3 depicts an exemplary process for aligning a 3D map dataset with 2D data captured by a 2D sensing device, in accordance with some embodiments.

FIG. 3 depicts an exemplary process for aligning the 3D map dataset with 2D data captured by a 2D sensing device, in accordance with some embodiments. The process 300 can correspond to the step 128 ("Static Alignment of Static Worlds") of process 100 depicted in FIG. 1. As described above with reference to FIG. 1, one or more 2D sensing devices 122 can capture 2D data 124 of the same physical environment. The 2D sensing device 122 may be cheaper and easier to maintain than the 3D sensing device 102, and it may be more feasible to deploy multiple 2D sensing devices to frequently survey the physical environment. During process 300, the 2D data captured by the 2D sensing devices is aligned with the high-fidelity 3D map dataset to allow for a richer understanding of the 2D data, which can include dynamic objects (e.g., moving vehicles) and dynamic traffic scenarios collisions).

In particular, process 300 includes identification of poses of the 2D sensors (e.g., 2D camera) mounted on the 2D sensing device at a given time. The pose of a sensor includes the 3D position and orientation (rotation angles) of the sensor usually in form 6 degrees of freedom (DOF; Y, Y, Z; pitch, roll, yaw), relative to a pre-selected world origin.

Process 300 is performed, for example, using one or more electronic devices. In some examples, the blocks of process 300 are divided up in any manner among the one or more electronic devices performing process 300. In some examples, the one or more electronic devices include the 2D sensing device 122 and additional electronic devices that are communicatively coupled with each other. Thus, while portions of process 300 are described herein as being performed by particular devices, it will be appreciated that process 300 is not so limited. In process 300, some blocks are, optionally, combined, the order of some blocks is, optionally, changed, and some blocks are, optionally, omitted. In some examples, additional steps may be performed in combination with the process 300. Accordingly, the operations as illustrated (and described in greater detail below) are exemplary by nature and, as such, should not be viewed as limiting.

With reference to FIG. 3, the process 300 is performed based on a high-fidelity 3D map dataset 216, GPS/IMU data stream 302 captured by the 2D sensing device, and color image sequence 304 captured by the 2D sensing device. As described above with reference to FIGS. 1 and 2, the high-fidelity 3D map dataset 216 can be obtained based on data captured by a 3D sensing device. In some embodiments, a copy of the 3D map dataset 216 is stored on the local memory of the 2D sensing device when the 2D sensing device is deployed to survey the physical environment and capture 2D data 302 and 304.

At step 306, coarse localization is performed based on the GPS/IMU stream 302. Specifically, based on the GPS/IMU stream 302 captured by the 2D sensing device, an estimate of the 2D sensor poses at a given time can be obtained. The estimate of the 2D sensor poses may of relatively low fidelity (e.g., which street, error tolerance of 1-2 meters).

Figure 6:
FIG. 6 depicts an exemplary 2D image captured by a 2D sensing device, with semantic types detected and tracked, in accordance with some embodiments.

At steps 308-312, the system extracts various information from the color image sequence 304 (e.g., color photos and videos) that is helpful to further refine the estimate of the 2D sensor poses. At step 308, the system can detect special features such as special encoded feature topologies (e.g., curve of the road) and planar color patches (e.g., building facets) from the color image sequence 304. At step 310, the system can align the color information from the camera sensor (e.g., 2D images) to features derived from LIDAR measurement such as depth discontinuities and LIDAR intensity. This is done by matching geometric features such as edges in the image to discontinuities in depth and LiDAR intensity. This can be done by matching semantic objects in depth and LiDAR intensity to semantic objects in color images. This can also be done by maximizing a high level quality score such as mutual information between the color images and LiDAR-depth/intensity. At step 312, the system can extract predefined semantic types such as traffic signs, lane markings, and road boundaries, from the color image sequence 304. FIG. 6 depicts an exemplary 2D image captured by a 2D sensing device, with semantic types detected and tracked. In some embodiments, the coarse estimate of the 2D sensor poses, which is obtained in step 306, and the 3D map dataset 216 are used to guide and/or verify step 308-312 (e.g., use GPS coordinates to identify semantic types).

At step 320, localization refinement is performed to refine the estimate of the sensor poses obtained in step 306 based on the various information extracted in steps 308-312. For example, the system can establish more precise alignment between the 3D map dataset 216 and the color image sequence 304 by matching certain features (e.g., road curves, building facets, surface textures, patches, edges) and certain semantic types (e.g., traffic signs, lane markings). Further, the system can establish more precise alignment and reduce error by focusing on aligning predefined regions of interest as described above. By aligning the high-fidelity 3D data of the static world and the 2D data of the same world, the precise poses of the 2D sensors can be determined, as shown in step 322.

Figure 7A:
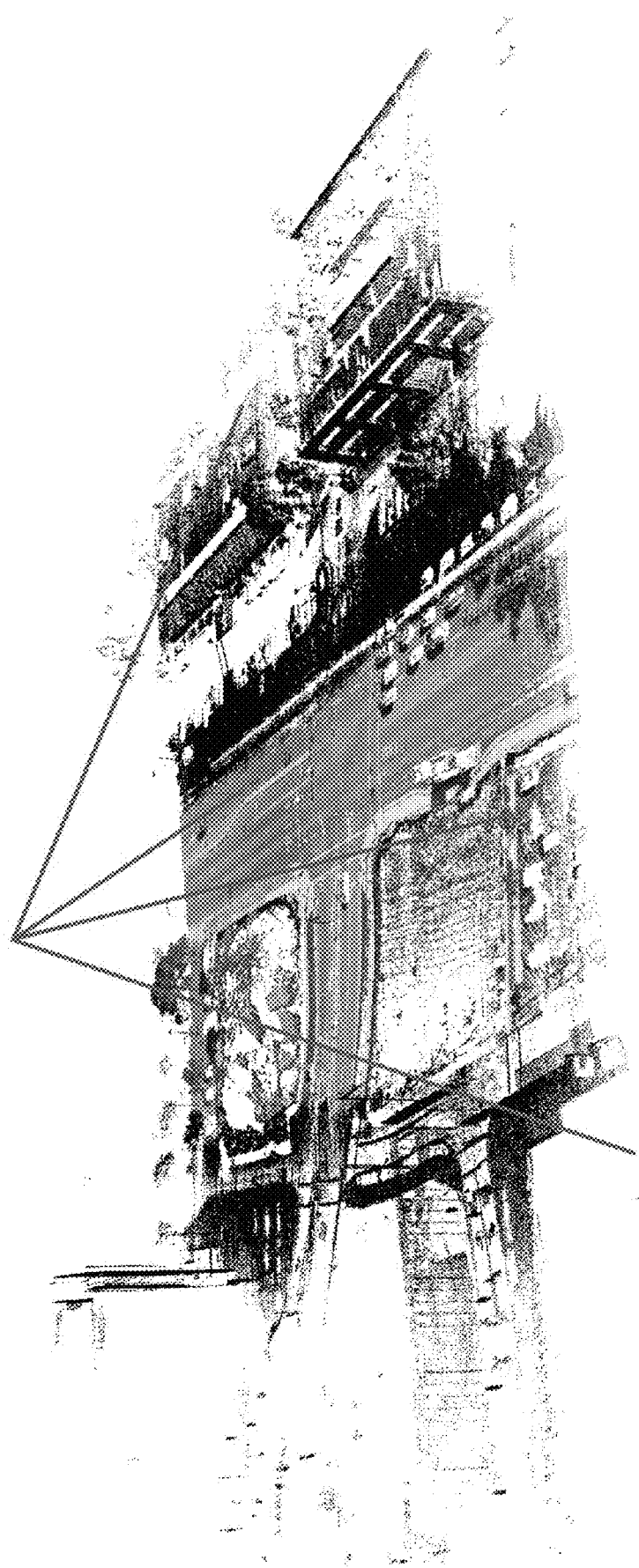
FIG. 7A depicts an exemplary view in which a 2D sensor is referenced/aligned to a high-fidelity 3D representation of the physical environment, in accordance with some embodiments.
Figure 7B:
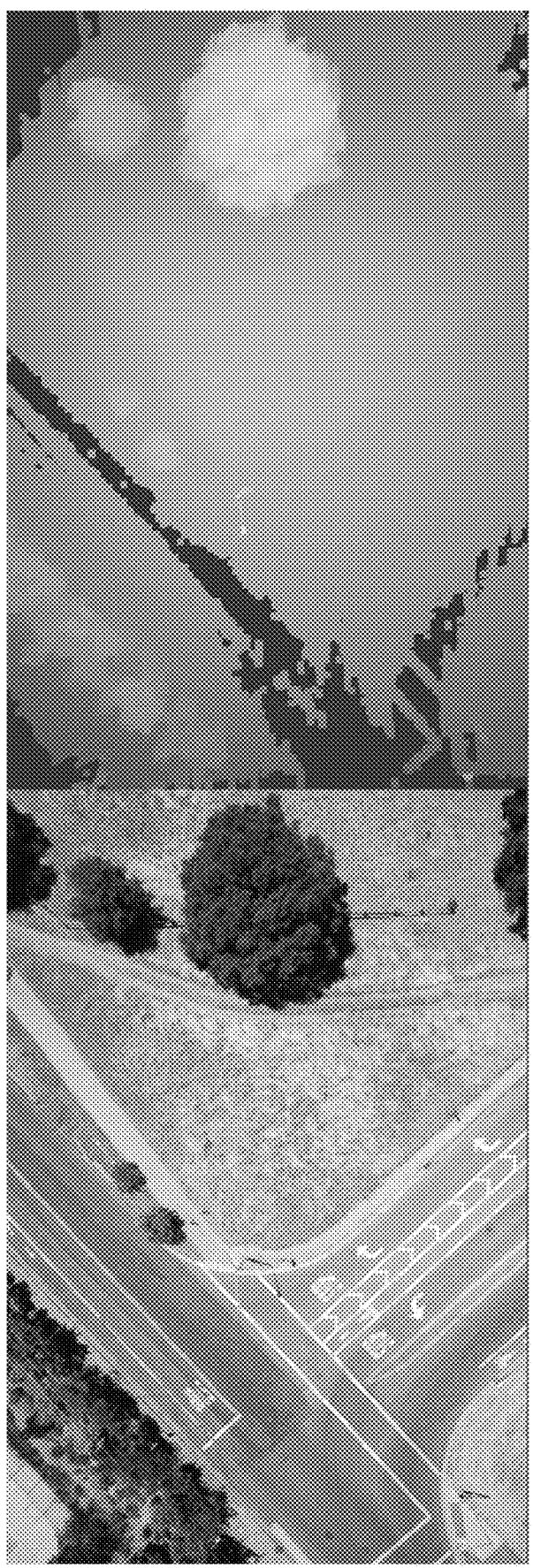
FIG. 7B depicts an exemplary 2D color image captured by a 2D sensing device and a corresponding aligned 3D depth map, in accordance with some embodiments.

FIG. 7A depicts an exemplary view in which the poses of a 2D sensor are identified with reference to a high-fidelity 3D representation of the physical environment. The camera frustum (the cone of visibility) is delineated. FIG. 7B depicts an exemplary 2D color image captured by a 2D sensing device and a corresponding aligned 3D depth map.

Figure 4:
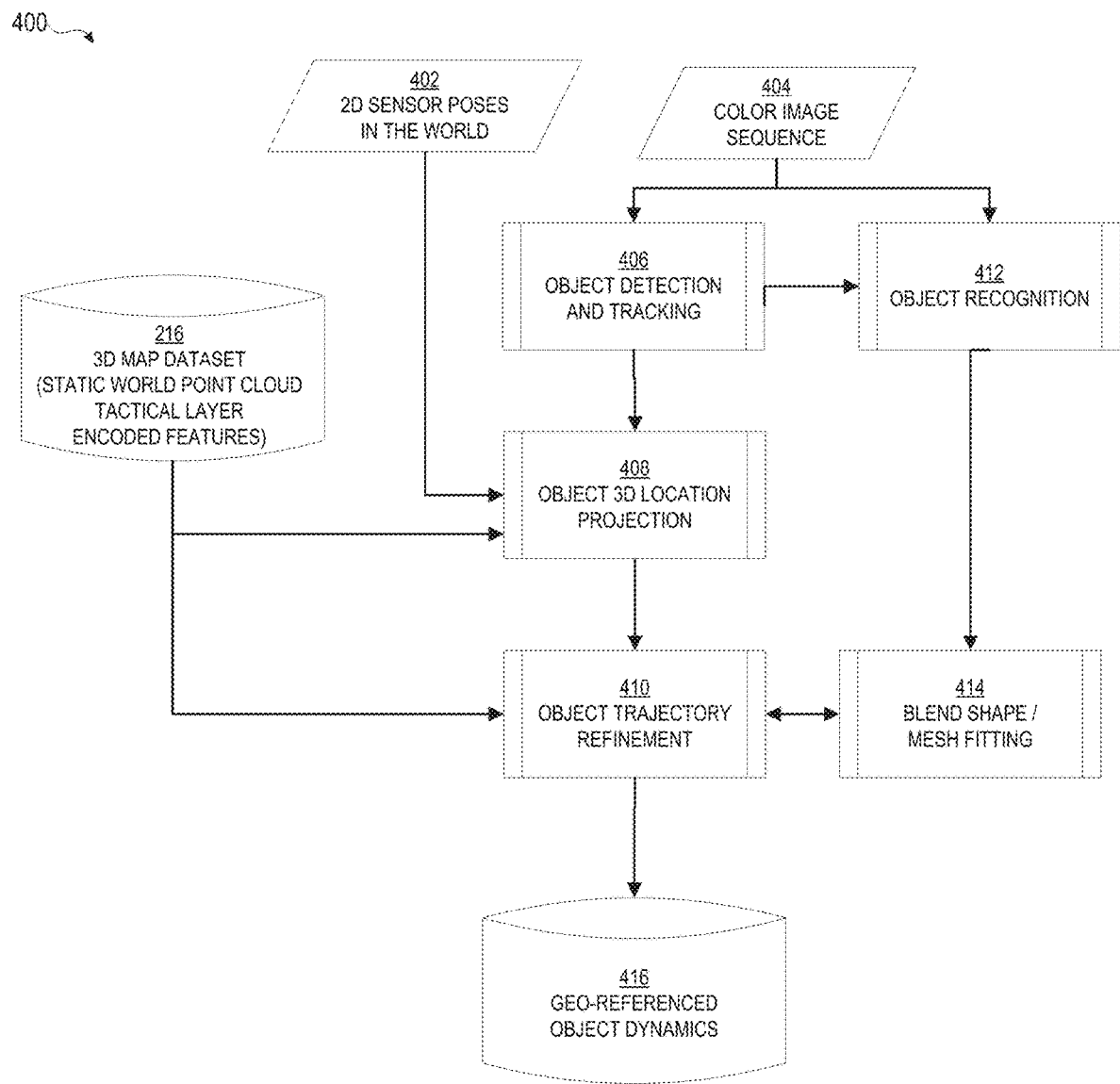
FIG. 4 depicts an exemplary process for tracking a dynamic 3D object captured by a 2D sensing device, in accordance with some embodiments.

FIG. 4 depicts an exemplary process for tracking a dynamic 3D object captured by a 2D sensing device, in accordance with some embodiments. As described above with reference to FIG. 1, one or more 2D sensing devices 122 can capture 2D data 124 that includes information of both the stationary environment (e.g., road, parking lot) and dynamic objects (e.g., vehicles, riders, pedestrians). The 2D data includes color image sequence 404, such as images and videos. In some embodiments, the color image sequence 404 is at least partially overlapped with the color image sequence 304 in FIG. 3.

Figure 8A:
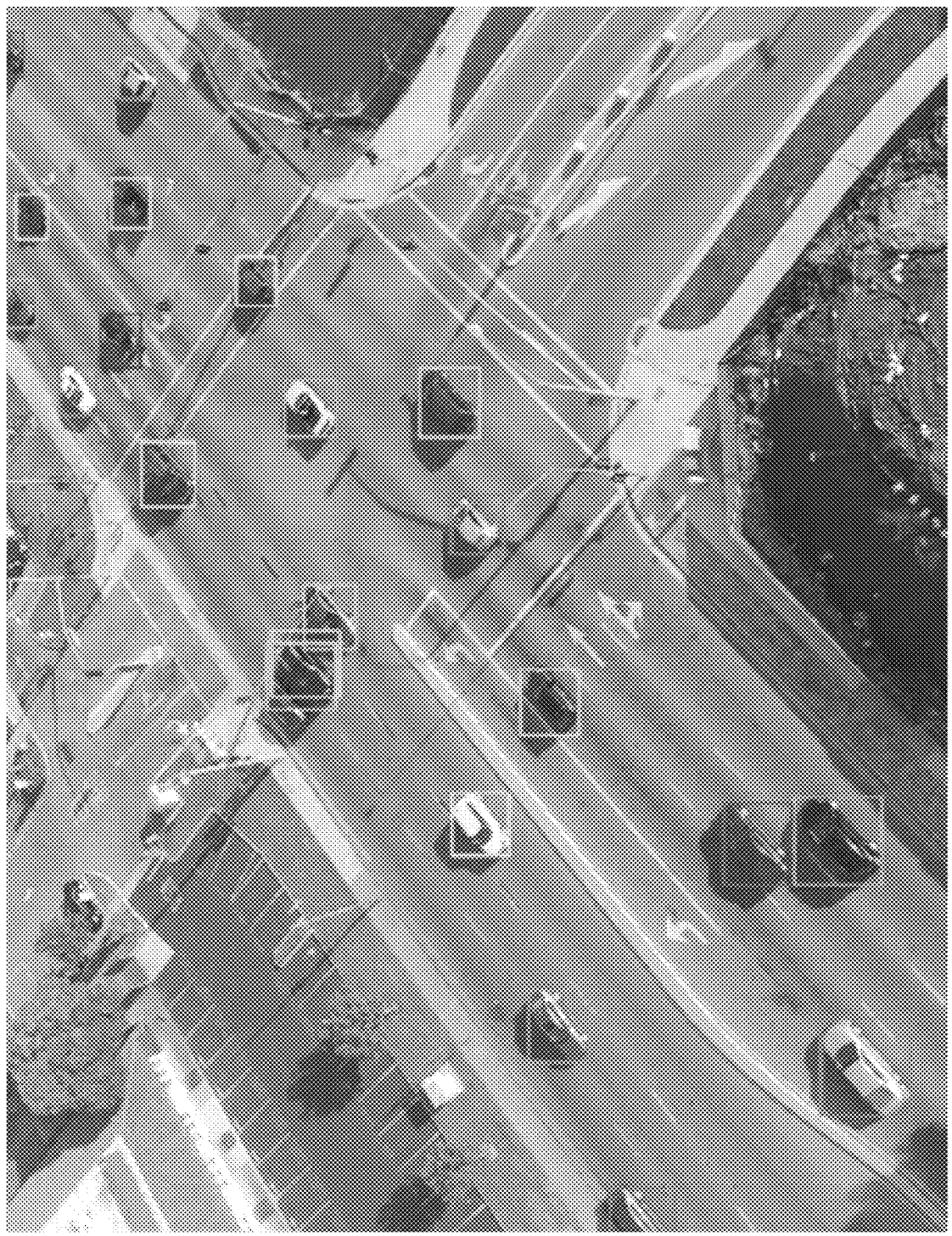
FIG. 8A depicts an exemplary 2D image captured by a 2D sensing device, with dynamic objects detected and tracked, in accordance with some embodiments.

At step 406, candidates of dynamic objects are detected based on the color image sequence 404 (e.g., video frames). In some embodiments, the detection is performed using one or more neutral network classifiers. FIG. 8A depicts an exemplary 2D image captured by a 2D sensing device, with dynamic objects (e.g., vehicles) detected and tracked.

At step 408, the candidate objects are projected to the aligned high-fidelity 3D map dataset to obtain 3D locations and GPS coordinates for each candidate object at each time stamp of the video. In some embodiments, the projection at a given time is performed based on the 2D sensor poses 402 for that time (i.e., the position and orientation of the 2D camera of the 2D sensing device at that time), which is obtained via process 300 described above.

At step 410, the object motion trajectory refinement is performed. Object trajectory refers to the 3D trace of a dynamic object in the 3D space. In some embodiments, the trajectory of an object is implemented as a list of object instances across a period of time. After obtaining the 3D locations of the each object in step 408, the sequence of object poses can be sent to a global optimization system. The global optimization system can constraint object motion with physically-correct moving dynamic model (e.g. bicycle model for vehicles), lane level information from the 3D map dataset (e.g., the various semantic types and features in the tactical layer), and the color image sequence 404 (e.g., features, colors, textures detected from the 2D images). In some embodiments, the optimization system first generates the coarse trajectories then makes adjustments in such a way to satisfy fidelity to motion constrains and fidelity to the 2D camera sensor measurements (e.g., objects have the same color/texture throughout the sequence, i.e. photometric consistency). This ensures the physical correctness of object poses and robustness to measurement noises, while generating accurate object moving dynamics—speed, acceleration, turning radius, etc. Also, it accurately estimates the object's GPS location and object-lane-association since all objects are directly aligned to the tactical layer of the 3D map.

At step 412, object recognition is applied to the tracked dynamic objects to further classify the objects. For example, for a tracked moving car, the system can further identify the color, make, and model of the car. As such, all the trajectories can be queried by the semantics (e.g., movement of a Toyota Camry at a particular intersection). In some embodiments, step 412 can be guided by/based on candidate objects detected or tracked in step 406. Moreover, in step 414, corresponding object shape models (object mesh or blend-shape with key points) for the identified object type can be fitted to the tracked object to give it further refinement and more details.

Figure 8B:
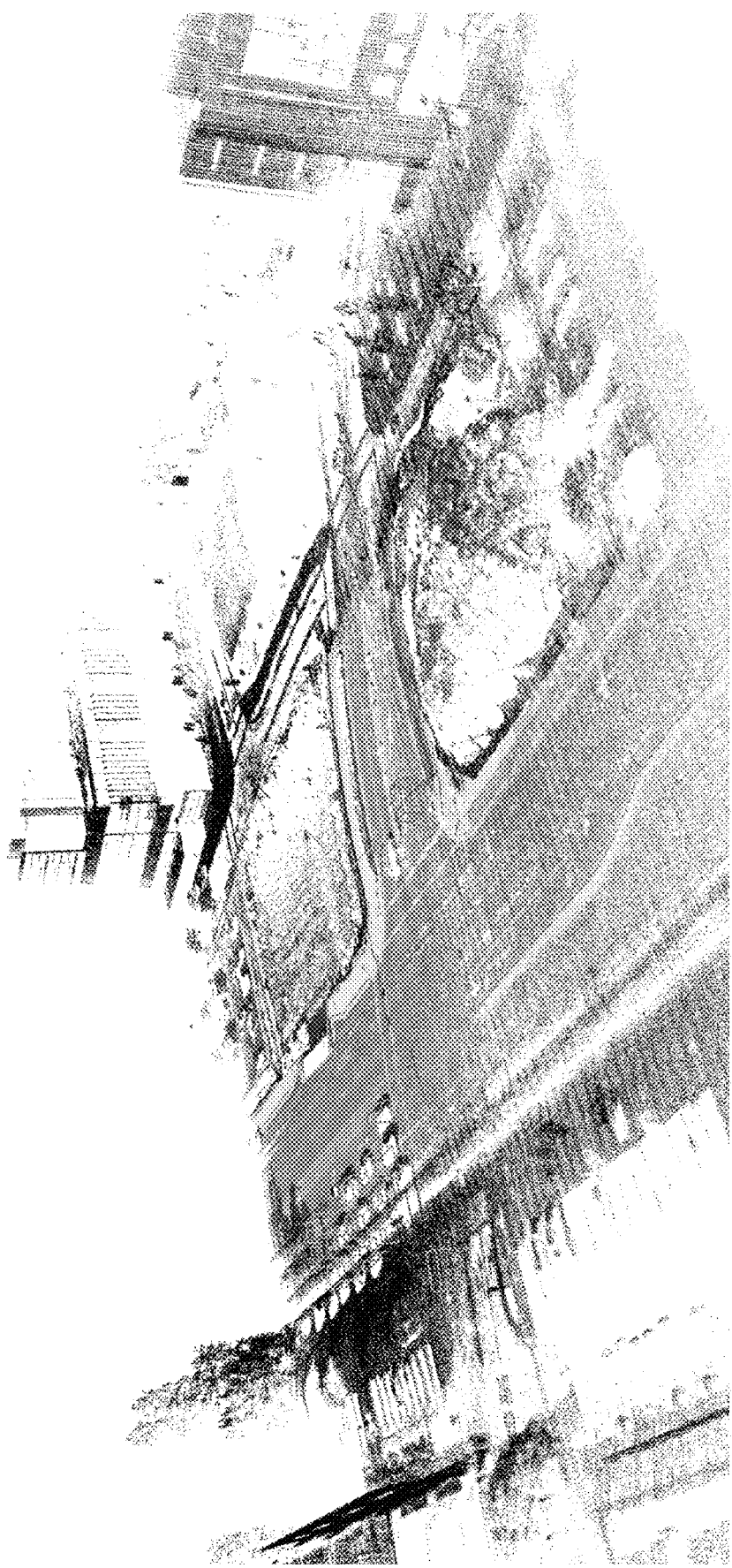
FIG. 8B depicts an exemplary view of dynamic objects captured via 2D data projected into a high-fidelity 3D representation of the physical environment, in accordance with some embodiments.
Figure 8C:
FIG. 8C depicts an exemplary view of dynamic objects captured via 2D data projected into a high-fidelity 3D representation of the physical environment, in accordance with some embodiments.

FIG. 8B depicts an exemplary view of dynamic objects captured via 2D data projected/overlaid onto a high-fidelity 3D representation of the physical environment. As shown in FIG. 8C, the vehicles, represented by cubes, are projected into the high-fidelity 3D representation of an intersection.

After step 410 is completed, the system obtains geo-referenced object dynamics 416. In some embodiments, the dynamic scenarios include behaviors of dynamic objects motion trajectories of vehicles, lane change, turns, actions of pedestrian such as jogging and crawling), interactions between dynamic objects (e.g., collisions), events (e.g., cars driving out of road boundaries), or a combination thereof. All of the dynamic objects and scenarios can be referenced with the rich information included in the 3D map dataset. For example, each object's location (e.g., altitude, latitude, and elevation), speed, acceleration/deceleration, trajectory, and behavior at a given time can be identified at a high level of fidelity. Further, each dynamic object's relationship with the stationary objects in the physical environment (e.g., lane markings) can be identified with a high level of fidelity.

In some embodiments, the geo-referenced object dynamics 416 includes, for a given time, the instance of a dynamic object having the following attributes: position of [longitude, latitude, altitude] in spherical coordinate or [X, Y, Z] in Cartesian coordinates; orientation of [pitch, roll, yaw] or quaternion [w, x, y, z]; velocity of [v_x, v_y, v_z]; acceleration of [a_x, a_y, a_z]. Further, 3D shape of an object can be represented as 3D cuboid, 3D mesh, or a combination thereof. In some embodiments, the geo-referenced object dynamics 416 includes trajectory movement types such as [Left turn, Right turn, U turn, left lane change, right lane change . . . ]. In some embodiments, the geo-referenced object dynamics 416 includes vehicle taxonomy such as [Sedan, SUV, Van, Pickup-truck, Semi-truck, Bus, . . . ]. In some embodiments, the geo-referenced object dynamics 416 includes object taxonomy such as [large-vehicle, small-vehicle, humans, trees, . . . ]. In some embodiments, various sub-taxonomies can be included, such as human type of [pedestrian, rider, other, . . . ] or human movement of [walking, running, crawling, lying down, . . . ].

FIG. 9 illustrates process 900 for generating a three-dimensional representation of a physical environment that can include dynamic objects and traffic scenarios, according to various examples. Process 900 is performed, for example, using one or more electronic devices, and the blocks of process 900 are divided up in any manner between the electronic devices. Thus, while portions of process 900 are described herein as being performed by particular devices, it will be appreciated that process 900 is not so limited. In process 900, some blocks are, optionally, combined, the order of some blocks is, optionally, changed, and some blocks are, optionally, omitted. In some examples, additional steps may be performed in combination with the process 900. Accordingly, the operations as illustrated (and described in greater detail below) are exemplary by nature and, as such, should not be viewed as limiting.

At step 902, a system obtains a set of three-dimensional data of the physical environment, wherein the three-dimensional data is associated with a first sensing device. At step 904, based on the set of three-dimensional data, the system generates a three-dimensional representation of the physical environment. At step 906, the system obtains a set of two-dimensional data of the physical environment, wherein the set of two-dimensional data is associated with a second sensing device and wherein the set of two-dimensional data comprises information of a dynamic object in the physical environment. At step 908, the system generates an alignment between the three-dimensional representation of the physical environment and the set of two-dimensional data. At step 910, based on the alignment, the system obtains a set of three-dimensional information associated with the dynamic object. At step 912, the system provides an output based on the set of three-dimensional information associated with the dynamic object.

Figure 10:
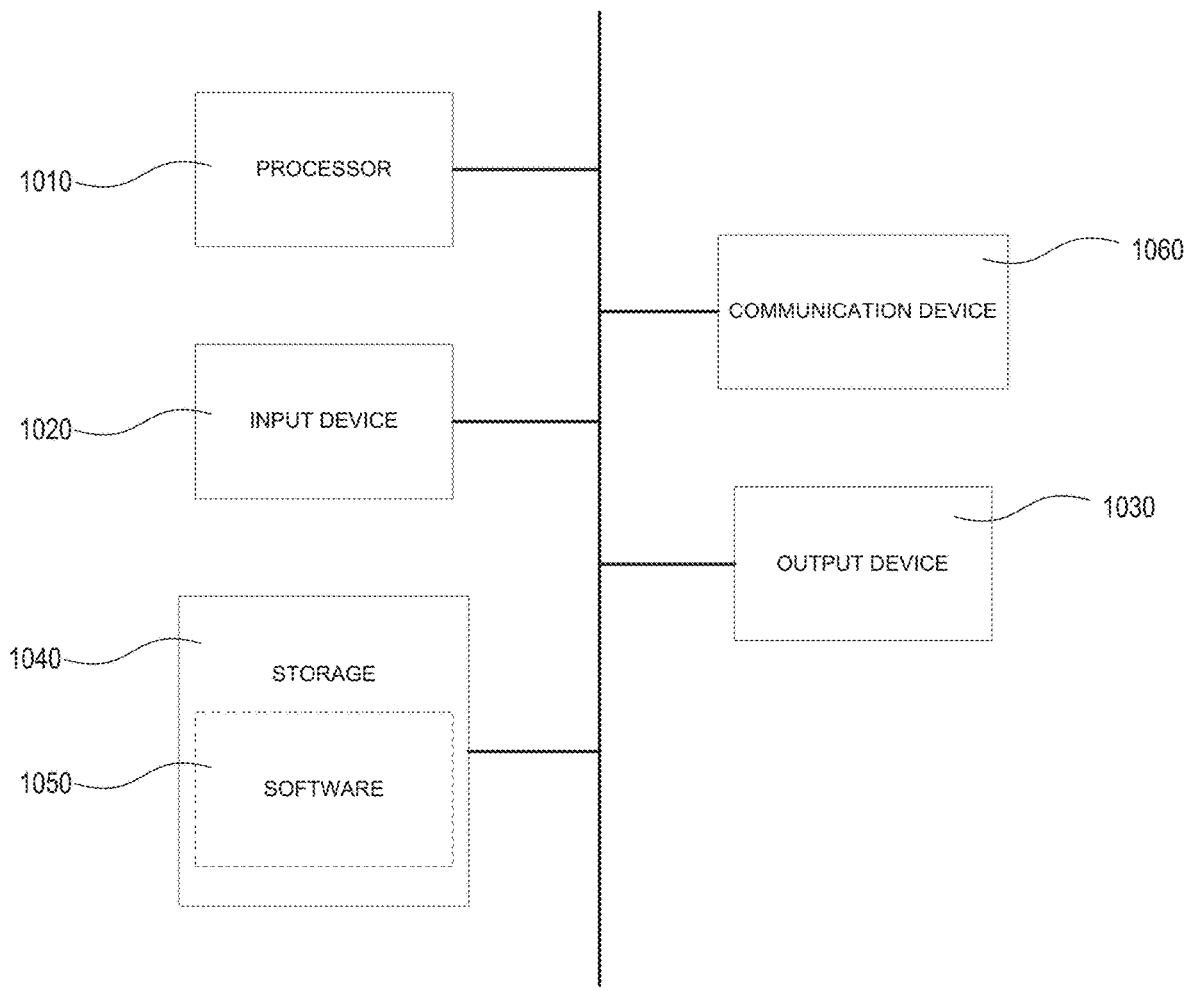
FIG. 10 depicts an exemplary electronic device in accordance with some embodiments.

The operations described above with reference to FIG. 9 are optionally implemented by components depicted in FIG. 10. It would be clear to a person having ordinary skill in the art how other processes 100-400 are implemented based on the components depicted in FIG. 10.

FIG. 10 illustrates an example of a computing device in accordance with one embodiment. Device 1000 can be a host computer connected to a network. Device 1000 can be a client computer or a server. As shown in FIG. 10, device 1000 can be any suitable type of microprocessor-based device, such as a personal computer, workstation, server or handheld computing device (portable electronic device) such as a phone or tablet. The device can include, for example, one or more of processor 1010, input device 1020, output device 1030, storage 1040, and communication device 1060. Input device 1020 and output device 1030 can generally correspond to those described above, and can either be connectable or integrated with the computer.

Input device 1020 can be any suitable device that provides input, such as a touch screen, keyboard or keypad, mouse, or voice-recognition device. Output device 1030 can be any suitable device that provides output, such as a touch screen, haptics device, or speaker.

Storage 1040 can be any suitable device that provides storage, such as an electrical, magnetic or optical memory including a RAM, cache, hard drive, or removable storage disk. Communication device 1060 can include any suitable device capable of transmitting and receiving signals over a network, such as a network interface chip or device. The components of the computer can be connected in any suitable manner, such as via a physical bus or wirelessly.

Software 1050, which can be stored in storage 1040 and executed by processor 1010, can include, for example, the programming that embodies the functionality of the present disclosure (e.g., as embodied in the devices as described above).

Software 1050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1000 can implement any operating system suitable for operating on the network. Software 1050 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A computer-enabled method for generating a three-dimensional representation of a physical environment, the method comprising:
   obtaining a set of three-dimensional data of the physical environment, wherein the three-dimensional data is associated with a first sensing device;
   based on the set of three-dimensional data, generating a three-dimensional representation of the physical environment;
   obtaining a set of two-dimensional data of the physical environment, wherein the set of two-dimensional data is associated with a second sensing device and wherein the set of two-dimensional data comprises information of a dynamic object in the physical environment, and wherein the set of two-dimensional data has a lower accuracy than the three-dimensional data;
   generating an alignment between the three-dimensional representation of the physical environment and the set of two-dimensional data by matching one or more static objects in the three-dimensional representation and the set of two-dimensional data;
   based on the alignment, obtaining a set of three-dimensional information associated with the dynamic object; and
   providing the set of three-dimensional information associated with the dynamic object for training an autonomous driving algorithm of an autonomous vehicle.

2. The method of claim 1, wherein the set of three-dimensional data of the physical environment comprises one or more scanned points by a LiDAR sensor of the first sensing device.

3. The method of claim 1, wherein the three-dimensional representation of the physical environment comprises a three-dimensional point cloud, a three-dimensional surface model, a two-dimensional projection image, a three-dimensional vector based road map, or a combination thereof.

4. The method of claim 1, wherein generating the three-dimensional representation of the physical environment comprises: identifying one or more predefined semantic types.

5. The method of claim 1, wherein generating the three-dimensional representation of the physical environment comprises: identifying one or more predefined features.

6. The method of claim 1, wherein generating an alignment between the three-dimensional representation of the physical environment and the set of two-dimensional data comprises: identifying pose information of a sensor of the second sensing device.

7. The method of claim 6, wherein the sensor is a camera.

8. The method of claim 1, wherein generating an alignment between the three-dimensional representation of the physical environment and the set of two-dimensional data comprises: identifying one or more predefined semantic types based on the set of two-dimensional data.

9. The method of claim 1, wherein generating an alignment between the three-dimensional representation of the physical environment and the set of two-dimensional data comprises: identifying one or more predefined features based on the set of two-dimensional data.

10. The method of claim 1, wherein obtaining a set of three-dimensional information associated with the dynamic object comprises:
   detecting the dynamic object from the set of two-dimensional data; and
   projecting the detected dynamic object to the three-dimensional representation of the physical environment.

11. The method of claim 1, further comprising: obtaining a trajectory of the dynamic object.

12. The method of claim 11, further comprising: refining the trajectory based on one or more dynamic models associated with the dynamic object, texture information identified from the set of two-dimensional data, one or more features identified from the set of two-dimensional data, or a combination thereof.

13. The method of any of claim 1, further comprising: obtaining one or more geo-referenced dynamic traffic scenarios.

14. The method of claim 1, wherein the first sensing device is an unmanned aerial system.

15. The method of claim 1, wherein the second sensing device is an unmanned aerial system.

16. An electronic device, comprising:
   one or more processors;
   a memory; and
   one or more programs, wherein the one or more programs are stored in the memory and configured to be executed by the one or more processors, the one or more programs including instructions for:
      obtaining a set of three-dimensional data of the physical environment, wherein the three-dimensional data is associated with a first sensing device;
      based on the set of three-dimensional data, generating a three-dimensional representation of the physical environment;
      obtaining a set of two-dimensional data of the physical environment, wherein the set of two-dimensional data is associated with a second sensing device and wherein the set of two-dimensional data comprises information of a dynamic object in the physical environment and wherein the set of two-dimensional data is of a lower accuracy than the three-dimensional data;
      generating an alignment between the three-dimensional representation of the physical environment and the set of two-dimensional data by matching one or more static objects in the three-dimensional representation and the set of two-dimensional data;
      based on the alignment, obtaining a set of three-dimensional information associated with the dynamic object; and
      providing the set of three-dimensional information associated with the dynamic object for training an autonomous driving algorithm of an autonomous vehicle.

17. A non-transitory computer-readable storage medium storing one or more programs, the one or more programs comprising instructions, which when executed by one or more processors of an electronic device having a display, cause the electronic device to:
   obtain a set of three-dimensional data of the physical environment, wherein the three-dimensional data is associated with a first sensing device;
   based on the set of three-dimensional data, generate a three-dimensional representation of the physical environment;
   obtain a set of two-dimensional data of the physical environment, wherein the set of two-dimensional data is associated with a second sensing device and wherein the set of two-dimensional data comprises information of a dynamic object in the physical environment, and wherein the set of two-dimensional data is of a lower accuracy than the three-dimensional data;
   generate an alignment between the three-dimensional representation of the physical environment and the set of two-dimensional data by matching one or more static objects in the three-dimensional representation and the set of two-dimensional data;
   based on the alignment, obtain a set of three-dimensional information associated with the dynamic object; and
   provide the set of three-dimensional information associated with the dynamic object for training an autonomous driving algorithm of an autonomous vehicle.

* * * * *